US009909557B2

(12) United States Patent
Christiansen

(10) Patent No.: US 9,909,557 B2
(45) Date of Patent: Mar. 6, 2018

(54) APPARATUS FOR APPLYING A LOAD TO AN INSTALLED WIND TURBINE BLADE AND METHOD OF USING THE SAME

(71) Applicant: Vestas Wind Systems A/S, Aarhus N. (DK)

(72) Inventor: Claus Bæk Christiansen, Ringkøbing (DK)

(73) Assignee: Vestas Wind Systems A/S, Aarhus N. (DK)

(*) Notice: Subject to any disclaimer, the term of this patent is extended or adjusted under 35 U.S.C. 154(b) by 114 days.

(21) Appl. No.: 14/899,592

(22) PCT Filed: Jun. 18, 2014

(86) PCT No.: PCT/DK2014/050175
§ 371 (c)(1),
(2) Date: Dec. 18, 2015

(87) PCT Pub. No.: WO2014/202091
PCT Pub. Date: Dec. 24, 2014

(65) Prior Publication Data
US 2016/0146194 A1  May 26, 2016

(30) Foreign Application Priority Data
Jun. 19, 2013  (DK) .................. 2013 70331

(51) Int. Cl.
F03D 1/00 (2006.01)
F03D 17/00 (2016.01)

(52) U.S. Cl.
CPC .............. *F03D 1/00* (2013.01); *F03D 17/00* (2016.05); *F05B 2260/83* (2013.01); *F05B 2270/808* (2013.01)

(58) Field of Classification Search
CPC ........ F03D 17/00; F03D 11/0091; F03D 1/00; G01M 5/0016; G01M 11/081; F05B 2250/43; G05B 2219/2619; G05B 19/0426
(Continued)

(56) References Cited

U.S. PATENT DOCUMENTS 8,033,791 B1  10/2011 Watanabe
2010/0018551 A1  1/2010 Gallegos
(Continued)

FOREIGN PATENT DOCUMENTS

EP  2369174 A1  9/2011
EP  2458198 A2  5/2012
(Continued)

OTHER PUBLICATIONS

Danish Patent and Trademark Office, Search Report issued in Application No. PA 2013 70331 dated Jan. 24, 2014.
(Continued)

Primary Examiner — Harshad R Patel
Assistant Examiner — Brandi Hopkins
(74) Attorney, Agent, or Firm — Wood Herron & Evans LLP

(57) ABSTRACT

A blade loading system for imposing a force on a wind turbine blade includes a portable load device having a cable, a tower support movably coupled to the tower, and a blade attachment device coupled to the blade and coupled to the cable, wherein when the blade attachment device is coupled to the blade and the tower support is adjacent the blade, the load device induces tension in the cable so that a force is imposed on the blade in a direction toward the tower. A method of applying a force to a blade includes: coupling a tower support to the tower adjacent the base, coupling a cable to the blade attachment device, raising the tower
(Continued)

support along the tower, coupling the blade attachment device to the blade, and tensioning the cable to provide a force on the blade in a direction toward the tower.

31 Claims, 4 Drawing Sheets

(58) Field of Classification Search
USPC .................................. 73/834, 856, 826, 788
See application file for complete search history.

(56) References Cited

U.S. PATENT DOCUMENTS

| | | | |
|---|---|---|---|
| 2010/0135797 A1* | 6/2010 | Nies | ........................ F03D 80/50 416/9 |
| 2010/0254813 A1* | 10/2010 | Dawson | ................ B66C 23/207 416/146 R |
| 2011/0138937 A1* | 6/2011 | Fritz | .................... G01M 11/081 73/865.8 |
| 2011/0140724 A1* | 6/2011 | Olson | .................. G01R 31/026 324/722 |
| 2013/0061683 A1 | 3/2013 | Baker et al. | |

FOREIGN PATENT DOCUMENTS

| | | |
|---|---|---|
| EP | 2458323 A1 | 5/2012 |
| WO | 20110117290 A1 | 9/2011 |
| WO | 2012054937 A1 | 4/2012 |

OTHER PUBLICATIONS

European Patent Office, International Search Report and Written Opinion issued in International Application No. PCT/DK2014/050175 dated Sep. 19, 2014.

* cited by examiner

APPARATUS FOR APPLYING A LOAD TO AN INSTALLED WIND TURBINE BLADE AND METHOD OF USING THE SAME

TECHNICAL FIELD

The invention relates generally to wind turbines, and more particularly to an apparatus for applying a load to a wind turbine blade that is installed on the wind turbine, as well as to a method of applying a load to an installed wind turbine blade.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

On certain occasions, it may be desired or required to inspect, repair, and/or test wind turbine blades after having been installed, and perhaps operated for a certain period of time. Because the blades are elevated above the ground, by as much as 50 or 60 meters to just reach the blade tip, an external mobile crane is often used to provide access to the blades. In this regard, the crane may include a personnel carrier (e.g., a basket) for transporting maintenance personnel and equipment to and from the blades in order to conduct the desired or required task. For example, to test a blade under load conditions, a crane lifts personnel up to the blade for installing equipment that applies a load to the blade.

Such a system, however, has a number of drawbacks. First, the need for an external crane to perform the task significantly increases the cost of the maintenance project. In this regard, crane rental is generally cost prohibitive and may be the greatest contributor to cost for the entire maintenance project. Second, some wind turbines may be located in remote areas which may be difficult to reach with a generally large, mobile crane. Additionally, moving personnel and equipment from the ground to the blade may raise safety precautions and may further be time consuming, as the crane must typically make multiple lifts in order to achieve the desired result (e.g., make the repair, conduct the test, etc.). Furthermore, the number of personnel for the project may be relatively large. For example, three or more workers are typically currently needed in projects such as these, which further increase costs.

Accordingly, there is a need in the wind turbine industry for a device or apparatus for applying a load to an installed wind turbine blade and a method for applying a load to a wind turbine blade that avoids the need for an external crane or other costly hoisting devices.

SUMMARY

A blade loading system for an assembled wind turbine having a tower, a nacelle, and a rotor having at least one wind turbine blade, the blade loading system configured to impose a force on the at least one wind turbine blade, includes a portable load device having a motor and a supply of cable, wherein the motor is configured to reel in/reel out the cable; a tower support configured to be movably coupled to the tower between a first position adjacent a base of the tower and an operative position adjacent the at least one blade, wherein the tower support has a guide member for redirecting the cable from the load device; and a blade attachment device configured to be coupled to the at least one blade and further configured to be coupled to the cable of the load device, wherein when the blade attachment device is coupled to the at least one blade and the tower support is in the operative position, the load device is configured to be activated to induce tension in the cable so that a force is imposed on the at least one blade in a direction toward the tower.

The tower support includes a closed-loop ring member configured to be disposed about the tower. In one embodiment, the ring member includes an elongate flexible tensioning member disposed within an outer protective cover. The elongate flexible tensioning member may be selected from the group consisting of a rope, a chain, a cable, or combinations thereof. The tower support may further comprise a tow line configured to be coupled to a drive device in the nacelle for moving the tower support relative to the tower. The tow line and the guide member are preferably on opposite sides of the tower support. In one embodiment, the guide member may include a sheave.

The blade attachment device is configured to couple to the at least one blade through only a friction coupling. In one embodiment, the blade attachment device includes an elongate main strut having a rigid inner member and an outer protective cover, wherein the main strut is configured to engage against a surface of the at least one blade; and a sling coupled to the main strut and configured to be coupled to the cable of the load device, wherein the main strut and sling defines a receiving space configured to receive a tip of the at least one blade therethrough. The main strut may be curved to generally correspond to the curvature of the at least one blade along the portion where the main strut is configured to engage the blade. The blade attachment device may further comprise a flap extending from the main strut opposite to the sling. The flap may have a color different than the at least one blade so as to operate as a visual indicator of the blade attachment device relative to the at least one blade. The blade attachment device may further include a first guideline configured to extend toward the tower base (e.g., ground or platform) during use, and a second guideline configured to extend toward the nacelle during use, wherein the first and second guidelines are configured to be manually manipulated to locate the blade attachment device relative to the blade.

The blade loading system may further include a load cell configured to provide an indication of the force imposed on the at least one blade from the blade loading system. Moreover, a controller may be operatively coupled to the load device and operatively coupled to the load cell, wherein the controller is configured to control the operation of the load device based on indications from the load cell. The blade loading system may additionally include an anchor configured to be coupled to the load device for supporting at least a portion of the load from the blade loading system during use. In one embodiment, the anchor is configured to be removably coupled to the tower.

A method of applying a force to a wind turbine blade on an assembled wind turbine, the wind turbine having a tower, a nacelle, and a rotor having at least one blade, includes: i) parking the wind turbine so that a wind turbine blade is pointed in a downward direction adjacent the tower; ii) coupling a tower support to the tower adjacent the base of the tower; iii) coupling a cable to a blade attachment device such that the cable engages a guide member of the tower support; iv) raising the tower support along the tower to an operative position adjacent the blade; v) coupling the blade attachment device to the blade; and tensioning the cable to provide a force on the blade in a direction toward the tower. Coupling the tower support to the tower includes forming a closed-loop ring member about the outside of the tower adjacent the base of the tower. In one embodiment, forming the closed-loop ring member further includes coupling portions of a flexible tensioning member to form the ring member.

Raising the tower support along the tower may include extending a tow line from the nacelle; coupling the tow line to the tower support; and pulling the tow line upwardly to move the tower support along the tower to the operative position. Preferably, the tow line is coupled to the tower support opposite to where the cable engages the guide member of the tower support. In one embodiment, the steps of extending the tow line from the nacelle and pulling the tow line upwardly include activating an on-board crane in the nacelle of the wind turbine. Furthermore, raising the tower support along the tower to the operative position includes providing a visual indicator on the blade, and raising the tower support along the tower until the tower support, such as the guide member thereof, is substantially horizontally aligned with the visual indicator.

In accordance with the method, coupling the blade attachment device to the at least one blade further comprise frictionally coupling the blade attachment device to the blade without a positive connection being formed between the blade attachment device and the blade. Coupling the blade attachment device to the blade may further include positioning the blade attachment device such that the blade extends through a closed-loop receiving space of the blade attachment device. Further, coupling the blade attachment device to the blade may include manually manipulating a first guideline extending from the blade attachment device toward the base of the tower, and manually manipulating a second guideline extending from the attachment device to the nacelle to position the blade attachment device relative to the blade. Coupling the blade attachment device to the blade may further include providing a visual indicator on the blade attachment device having a color that contrasts with the color of the blade and positioning the blade attachment device relative to the blade using the visual indicator.

In further accordance with the method, tensioning the cable to provide a force on the blade further comprises activating a load device positioned adjacent the base of the tower and operatively coupled to the cable so as to induce tension in the cable. The method may further include providing an indication of the force acting on the blade from the blade loading system, and controlling the load device based on the indication of the force in order to reach or maintain a desired force acting on the blade. On the occasion that it is desired to perform a task on multiple blades of a wind turbine, the method may include releasing the tension in the cable, removing the blade attachment device from the blade, rotating the rotor so that another blade is pointed in the downward direction adjacent the tower while maintaining the tower support in its operative position, coupling the blade attachment device to the another blade, and tensioning the cable to provide a force on the another blade in a direction toward the tower.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DETAILED DESCRIPTION

Figure 1:
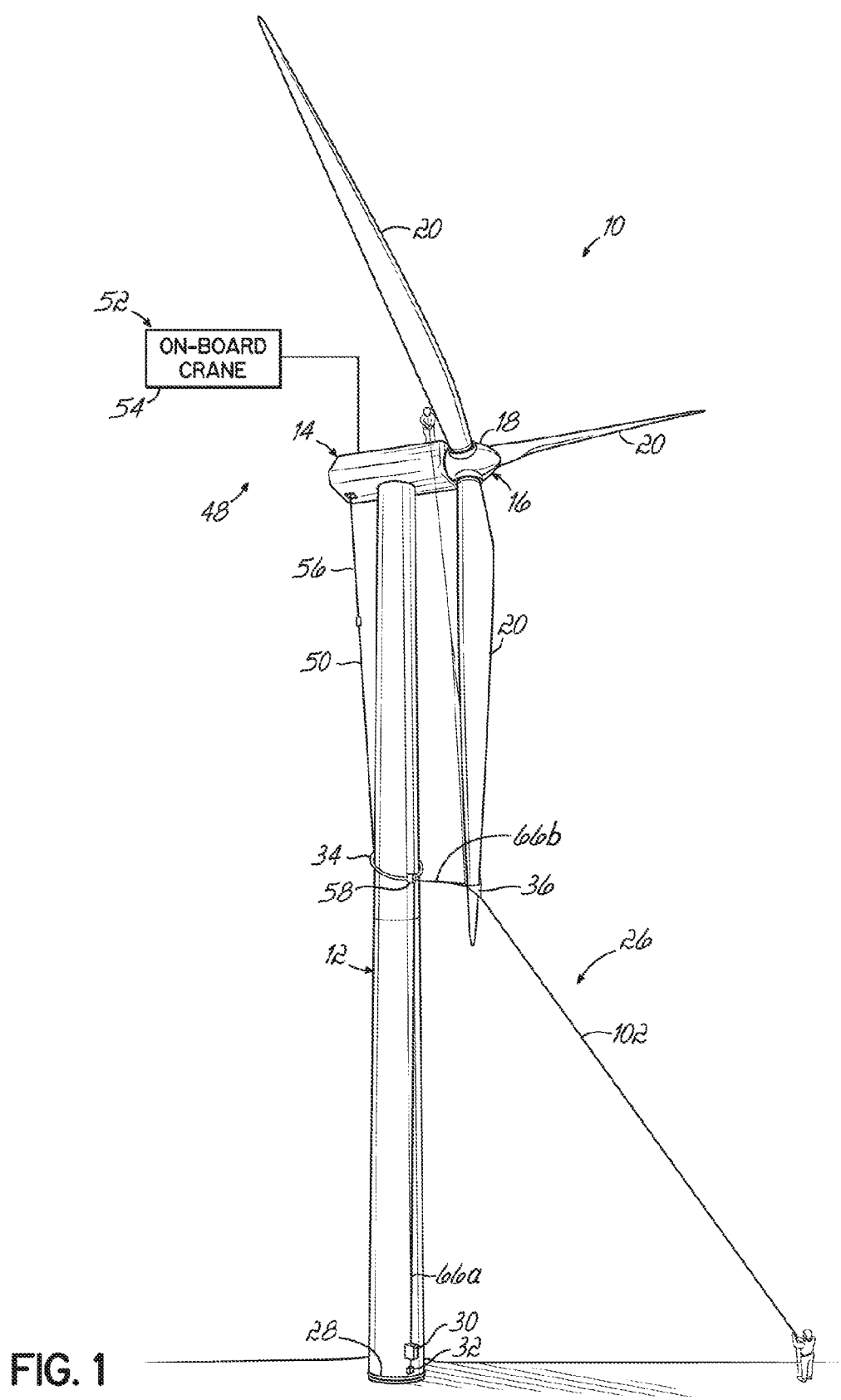
FIG. 1 is a perspective view of a wind turbine having a blade loading system in accordance with an embodiment of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

As discussed above, for various reasons, it may be desirable to apply a load to or position a tool or other piece of equipment on one or more of the wind turbine blades 20 after the blade is already installed to the wind turbine 10. For example, during an inspection of the blade or during a blade repair procedure, it may be desirable to apply a force or load to the blade as a way to more positively constrain or secure the position of the blade, and thus facilitate the inspection or repair by maintenance personnel. By way of further example, during a test procedure for blade strength and/or blade integrity, it may be desirable to apply a test force or test load to a stationary blade to simulate in-use blade loading and thereby ascertain certain structural information of the blade, such as blade defects. To this end, and in accordance with an embodiment of the invention, FIG. 1 illustrates an exemplary blade loading system 26 for applying a force or load to a wind turbine blade 20 after the blade 20 has been installed on the wind turbine 10.

Figure 2:
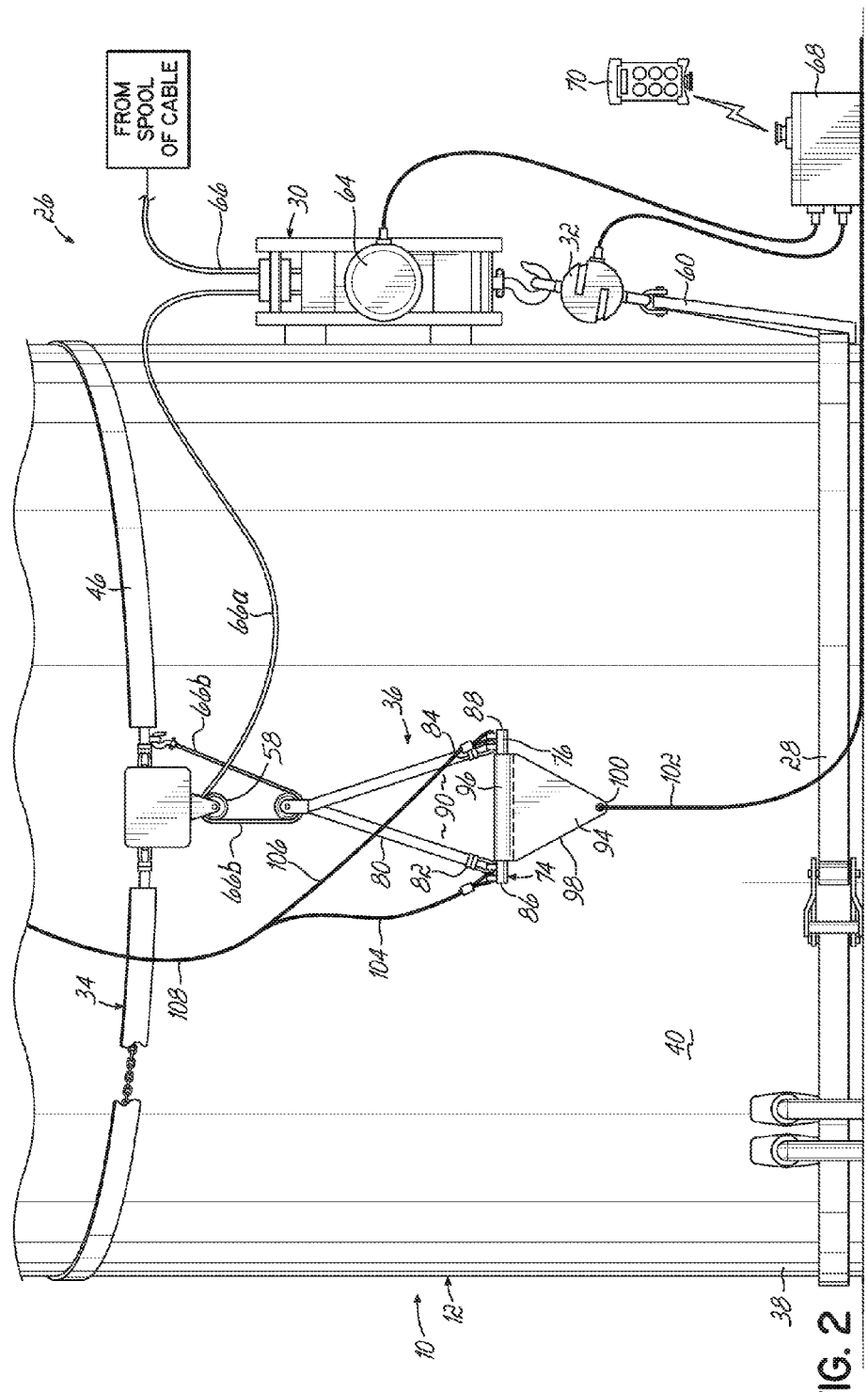
FIG. 2 is an enlarged partial view of the blade loading system illustrated in FIG. 1.
Figure 3:
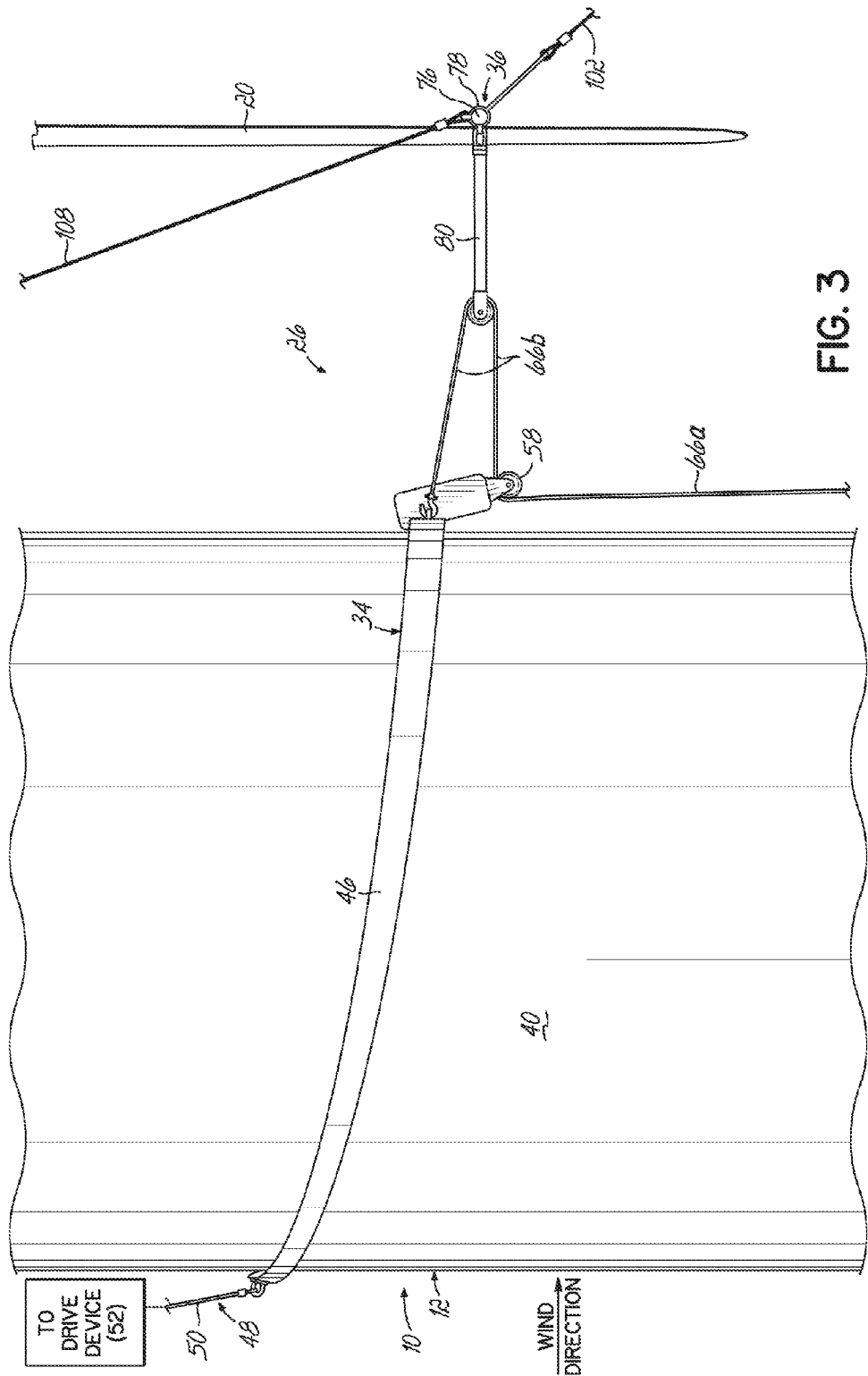
FIG. 3 is another enlarged partial view of the blade loading system.

As illustrated in FIGS. 1-3, in an exemplary embodiment, the blade loading system 26 generally includes a fixed attachment or anchor 28, a portable load device 30, a load cell 32, a tower support 34, and a blade attachment device 36. The anchor 28 is configured to provide a fixed support for the blade loading system 26 such that, for example, a substantial portion of the load in the blade loading system 26 may be transferred to the anchor 28 during use. Preferably, the anchor 28 is located adjacent a base 38 of the wind turbine tower 12 so as to be easily accessible by maintenance personnel (FIG. 2). In one embodiment, for example, the anchor 28 may be located in the ground adjacent the base 38 of the tower 12 (or on a platform adjacent the base of the tower for off-shore applications). The anchor 28 may be permanently fixed in the ground or removably positioned in the ground prior to applying a load to a blade. Additionally, the anchor 28 may be removably positioned on the ground. For example, the anchor 28 may be provided by a service vehicle or other heavily weighted item on the ground adjacent the base 38 of the tower 12.

Alternatively, the anchor 28 may be coupled to the tower 12 such that the forces in the blade loading system 26 are ultimately transferred back to the tower 12 (and to the ground via the wind turbine's foundation). In an exemplary embodiment of the invention, this may be configured as a non-permanent, removable attachment to the tower 12. In this regard, the anchor 28 may include one or more straps (e.g., nylon straps) configured to be tightly wrapped about the outer surface 40 of the tower 12 adjacent the base 38. For example, the anchor 28 may include one or more ratchet straps capable of being tightly secured about the outside 40 of the tower 12, as illustrated in FIG. 2. The anchor 28 may cooperate with various tower features, such as the ventilation tubes, for example, to help secure the position of the anchor 28 to the tower 12. The anchor 28 may include various padding and/or a protective cover so that the anchor does not scratch the tower 12 or cause some other type of damage to tower 12. While a non-permanent embodiment of anchor 28 may be preferred as described above, it should be recognized that in a further alternative embodiment, the anchor 28 may be permanently fixed to the tower 12. For example, various bolts, studs, bosses, etc. may be fixed to the tower 12 for providing the anchor 28 of the blade loading system 26.

The tower support 34 is configured to effectively control the direction of the force acting on the blade 20 from the blade loading system 26 (e.g., see FIG. 1). In this regard, to minimize the net force the blade loading system 26 imposes on the blade 20 in order to achieve a certain loading (e.g., a bending load in the blade), it may be desirable to have the imposed force act on the blade 20 generally at an angle of about 90° relative to the longitudinal axis of the blade 20. If the load device 30 is near the base 38 of the tower 12 and the force generating cables of the load device 30 run directly to the blade 20 without any redirecting, then the angle that the cable, and thus the force, makes with the blade 20 is high (e.g., 160° or higher). In this orientation, only a relatively small component or fraction of the net force in the cable operates to impose a bending load on the blade 20. Thus, to achieve a desired bending load on the blade 20, the load device 30 would have to be capable of generating a very high net force. This would increase the size of the load device and cable, as well as impose a large tension load on the blade 20, which may be undesirable.

These drawbacks may be generally avoided by orienting the winch cables (discussed below) so that they extend in a generally perpendicular manner relative to the longitudinal axis of the blade 20. In this way, a relatively high fraction of the net force operates to impose a bending load on the blade 20. In an embodiment of the invention, this may be achieved by the tower support 34. In this regard, the tower support 34 may be coupled to tower 12 so as to permit generally vertical movements of the tower support 34 along the tower 12. In one embodiment, the tower support 34 may be configured as a ring member 46 disposed about the outer surface 40 of the tower 12. In this embodiment, the ring member 46 may be sized slightly larger than the tower 12 so as to permit movement of the ring member 46 relative to the tower 12.

In one embodiment, the ring member 46 may be formed by a rigid, generally circular bar member (beam, rod, etc.) made from a material suitable for accommodating the forces imposed thereon by the blade loading system 26 (not shown). By way of example, the bar member may be formed from iron, steel, aluminum, or other suitable materials. Additionally, the rigid bar member may be formed from two or more bar segments which are coupled together at the wind turbine site in an end-to-end manner, for example, so as to form the complete closed-loop bar member. In another embodiment, however, the ring member 46 may be formed from a generally flexible, elongate tensioning member. For example, the ring member 46 may be formed from a sufficient length of rope, cable, chain, etc. Such tensioning members are capable of supporting a load in tension, but generally incapable of supporting a load in compression. This allows the tensioning member to be foldable and more compact, for example, which may facilitate storage and transport of the blade loading system 26. In any event, the tensioning member may be disposed about the outer surface 40 of the tower 12 and the ends or portions thereof coupled in a manner generally known in the art so as to form a closed-loop ring about the tower 12. In this configuration, for example, the ring member 46 is capable of supporting loads in a generally radial direction away from the tower 12.

Because the tower support 34 is in close proximity to the tower 12 and configured to move relative to the tower 12, the tower support 34 may include padding and/or an outer protective cover to prevent the tower support 34 from scratching or otherwise damaging the tower 12 during its relative movement and use. By way of example, in an exemplary embodiment, the tower support 34 may be formed by a metal chain disposed within an outer tubular cover (e.g., a fire hose). The invention, however, is not limited to this particular construction of the tower support 34 and other tensioning members and outer protective covers may be used and remain within the scope of the present invention.

To facilitate movement of the tower support 34 along the tower 12, the tower support 34, may further include a lift system, generally shown at 48 (FIG. 1). In one embodiment, the lift system 48 includes a tow cable 50 coupled to the tower support 34 at one end thereof and coupled to a drive device 52 (shown schematically) at another end thereof, wherein the drive device 52 is configured to reel-in/reel-out a tow cable 56 so as to move the tower support 34 along the tower 12. In an exemplary embodiment, the drive device 52 may be provided by the on-board crane 54 (shown schematically) of the wind turbine 10 located in the nacelle 14. In this regard, the tow cable 56 of the on-board crane 54 may be coupled to tow cable 50, which is in turn coupled to tower support 34. Alternatively, the tow cable 56 of the on-board crane 54 may be coupled directly to the tower support 34 without an intervening cable. In a further alternative embodiment, instead of using the on-board crane 54, a temporary drive device 52, such as a relatively small portable winch or the like, may be located in the nacelle 14 for lifting the tow cable 50 or tower support 34. In any event, as will be made clear below, the lift system 48 may be configured to lift the tower support 38 along the tower 12 such that the tower support 38 is adjacent the blade 20 when the blade is in its downward, six o'clock position (i.e., the blade is oriented generally parallel to the tower 12).

In addition to the above, the tower support 34 includes a guide member, such as a sheave or pulley 58, coupled thereto for redirecting or reorienting the winch cabling (discussed below). The sheave 58 should be sized so as to support the loads being applied by the blade loading system 26 thereon. For example, in one embodiment, the sheave 58 may be rated at about 2 tons. Those of ordinary skill in the art will recognize how to size the sheave 58 for the particular application. Moreover, in a preferred embodiment the sheave 58 may be located on the tower support 34 opposite to where the cable 50 or the lift system 48 couples to the tower support 34 (FIGS. 1 and 3). Thus, the sheave 58 and the attachment point for cable 50 or the lift system 48 are generally on opposite sides of the tower support 34 and on opposite sides of the tower 12 (e.g., 180° apart). Similar to the above, the sheave 58 may include padding and/or a protective cover so as to prevent the sheave 58 from scratching or otherwise damaging the tower 12 during movement of the tower support 34 or use of the blade loading system 26. While a sheave 58 may be preferred embodiment, other guide members that redirect or reorient the winch cabling in a relatively low-friction manner may also be used in various alternative embodiments.

As illustrated in FIGS. 1 and 2, the load system 30 may be located adjacent the base 38 of the tower 12 so as to be readily accessible by maintenance personnel and coupled to the anchor 28 so as to restrict or limit movement of the load device 30 during use. It should be recognized, however, that the load device 30 may have other locations in the blade loading system 26. Generally, the load device 30 should be in the path between the anchor 28 and the blade attachment device 36. In accordance with an aspect of the invention, the load device 30 does not form part of a crane or other large hoisting device, but is configured to be readily portable by a maintenance worker. More particularly, the load device 30 is configured to be within the lifting limits of a typical adult worker. For purposes of illustration and description, the load device 30 and the sheave 58 and blade attachment device 36 are shown circumferentially offset from each other in FIG. 2. As implemented, however, it should be appreciated that the load device 30 is preferably vertically aligned with the sheave 58 and blade attachment device 36, as generally illustrated in FIG. 1. However, other arrangements, including various non-vertical offsets, may also be used. The load device 30 may be coupled to the anchor 28 by a sling, cable, or other suitable coupling member 60. For example, a sling may be used to reduce scratching or possibly other damage to the wind turbine tower 12.

The load device 30, which may include a winch device, for example, may be of a generally conventional design and include a controllable motor 64 and a supply of cable 66, such as provided by a spool of cable, operatively coupled to the motor 64 for reeling-out or reeling-in the cable 66. The motor 64 may be an electric motor, for example, and be operatively coupled to a controller 68 for controlling the motor 64. Other types of motors, such as hydraulic motors, pneumatic motors, electro-mechanical motors, hydraulic pistons, etc., may also be used in various embodiments of the invention. The controller 68 may also include a remote control 70 so that the load device 30 may be controlled remotely, such as from the nacelle 14 or on the ground, but from a distance from the base 38 of the tower 12. The load device 30 should not be limited to that illustrated here, but encompass a variety of portable devices capable of applying tension to a cable.

The cable 66 of the load device 30 extends from the motor 64 at the base 38 of the tower 12 to the sheave 58 on the tower support 34. This first portion 66a of the cable 66 extends generally vertically or parallel to the tower 12 during use, as illustrated in FIGS. 1 and 3. The cable 66 then extends from the sheave 58 to the blade attachment device 36 (discussed in detail below), which is configured to be coupled to the blade 20. In one embodiment, the cable 66 may extend directly from the sheave 58 to the blade attachment device 36 (not shown). In an alternative embodiment, however, the cable 66 may extend between the tower support 34 and the blade attachment device 36 multiple times to achieve a desired force and/or loading rate at which the force is being applied to the blade 20. Those of ordinary skill in the art will understand how to arrange the cable 66 between the tower support 34 and the blade attachment device. In any event, the second portion 66b of the cable 66 may be configured to be generally perpendicular to the blade 20 (e.g., 90°±15°). This may be controlled, for example, by the proper placement of the tower support 34 along the tower 12.

The blade attachment device 36 is configured to allow a force generated by the blade loading system 26 to be imposed on the blade 20 without damaging the blade 20. In this regard and as illustrated in FIGS. 2 and 3, the blade attachment device 36 may include a main strut 74 having a generally rigid inner member 76 for load transfer to the blade 20 and an outer protective cover 78 to prevent or reduce the likelihood of damage to the blade 20. In one embodiment, the inner support 76 may include a metal bar, such as an aluminum bar. Of course, other metal or non-metal materials may also be used for the rigid inner support. The inner member 76 may also be slightly curved so as to correspond to or more closely match the curvature of the blade 20 at the desired location of the blade attachment device 36 on the blade 20. The inner member 76 should have a length sufficient to span the blade 20 when positioned thereagainst. For example, the inner member 76 may be about 1.2 m in length. Other lengths, however, are possible depending on the particular arrangement. In one embodiment, the outer cover 78 may include foam padding or other resilient or non-resilient materials that sufficiently prevent the inner member 76 from damaging the blade 20.

The blade attachment device 36 further includes a sling or strap 80 having first and second ends 82, 84 coupled to respective first and second ends 86, 88 of the main strut 74. The sling 80 may include along a central portion thereof a connector, such as a clip, shackle, sheave or the like (sheave shown), for coupling to the cable 66 of the load device 30 to the blade attachment device 36. In this way, when the sling 80 is tensioned or pulled tight, a generally triangular receiving space 90 is formed between the sling 80 and strut 74. As will be discussed below, the blade 20 is configured to be received in receiving space 90 during use of the blade loading system 26. The blade attachment device 36 is configured to be mounted to the blade 20 through a friction coupling. In this regard, the blade attachment device 36 has no connector, fastener, etc. for making a positive connection with the blade. Instead, as the cable 66 is tensioned, the main strut 74 abuttingly engages against a surface of the blade 20 and is held there against the blade through friction. This type of engagement allows the blade attachment device 36 to be quickly coupled and uncoupled from the blade 20, and further overcomes the need for maintenance personnel to be raised to the blades, such as by a crane, to facilitate a coupling to the blade.

Still further, the blade attachment device 36 may include a generally triangular flap 94 (e.g., akin to a kite) which provides a number of useful functions to the blade loading system 26. The flap 94 includes a base 96 that is coupled to or wrapped about the strut 74 such that the sides 98 of the flap 94 are generally between the two ends 86, 88 of the strut 74, and the apex 100 of the flap 94 is spaced from the strut 74. One function of the flap 94 is to help control the positioning of the blade attachment device 36 relative to the blade 20 during use. In this regard, the blade attachment device 36 includes a first guide line 102 coupled to the flap 94 adjacent the apex 100 of the flap 94. As discussed below, the first guide line 102 may be configured to aid in the generally horizontal placement of the blade attachment device 36 relative to the blade 20. The blade attachment device 36 may further include second and third guide lines 104, 106 coupled to the opposing base ends of the flap 94 or coupled to the ends 86, 88 of the main strut 74. As discussed below, the second and third guide lines 104, 106 may be configured to aid in the generally vertical placement of the blade attachment device 36 relative to the blade 20. It should be recognized that while the second and third guide lines 104, 106 may be two separate guide lines, in an exemplary embodiment, the second and third guide lines 104, 106 may be portions of a single line which may be coupled to another guide line 108 which may extend up to the nacelle 14 of the wind turbine 10 (e.g., Y-shaped). This will be discussed in more detail below.

In another aspect, the flap 94 provides another useful function. In this regard, the flap 94 may operate as a visual aid for locating the blade attachment device 36 relative to the blade 20. To this end, the flap 94 may be colored so as to contrast with the color of the blade 20. In one embodiment, for example, the blade 20 may be generally white and the flap 94 may be colored blue (e.g. navy blue) to contrast against the blade color. However, other contrasting colors may also be used. This color contrast helps the maintenance personnel locate the strut 74 on the back side of the blade 20 during use, as will be explained below.

The load cell 32 of the blade loading system 24 is configured to provide an indication of the magnitude of the force acting on the blade 20 from the blade loading system 26. This then allows the maintenance personnel to adjust the load device 30 in order to achieve a desired loading, as determined, for example, by the particular task being performed. To this end, as illustrated in FIG. 2, the load cell 32 may be spliced in between the anchor 28 and the load device 30 at the base 38 of the tower 12. It should be recognized, however, that the load cell 32 may have other locations in the blade loading system 26. For example, the load cell 32 may be incorporated in the load device 30. Generally, the load cell 32 should be in the "force path" between the anchor 28 and the blade attachment device 36. Furthermore, the load cell 32 may be operatively coupled to the controller 68 so that the load device 30 may be controlled in a manner to reach or maintain a certain force acting on the blade 20. For example, the controller 68 may be configured to communicate the reading from the load cell 32 to the remote control 70 so that maintenance personnel may control the load device 30 via the remote control 70, for example, to achieve or maintain a certain force. The load cell 32 may be a strain gauge, a hydraulic load cell, a pneumatic load cell, a piezoelectric load cell, or other type of load cell, as is generally known in the art.

Figure 4:
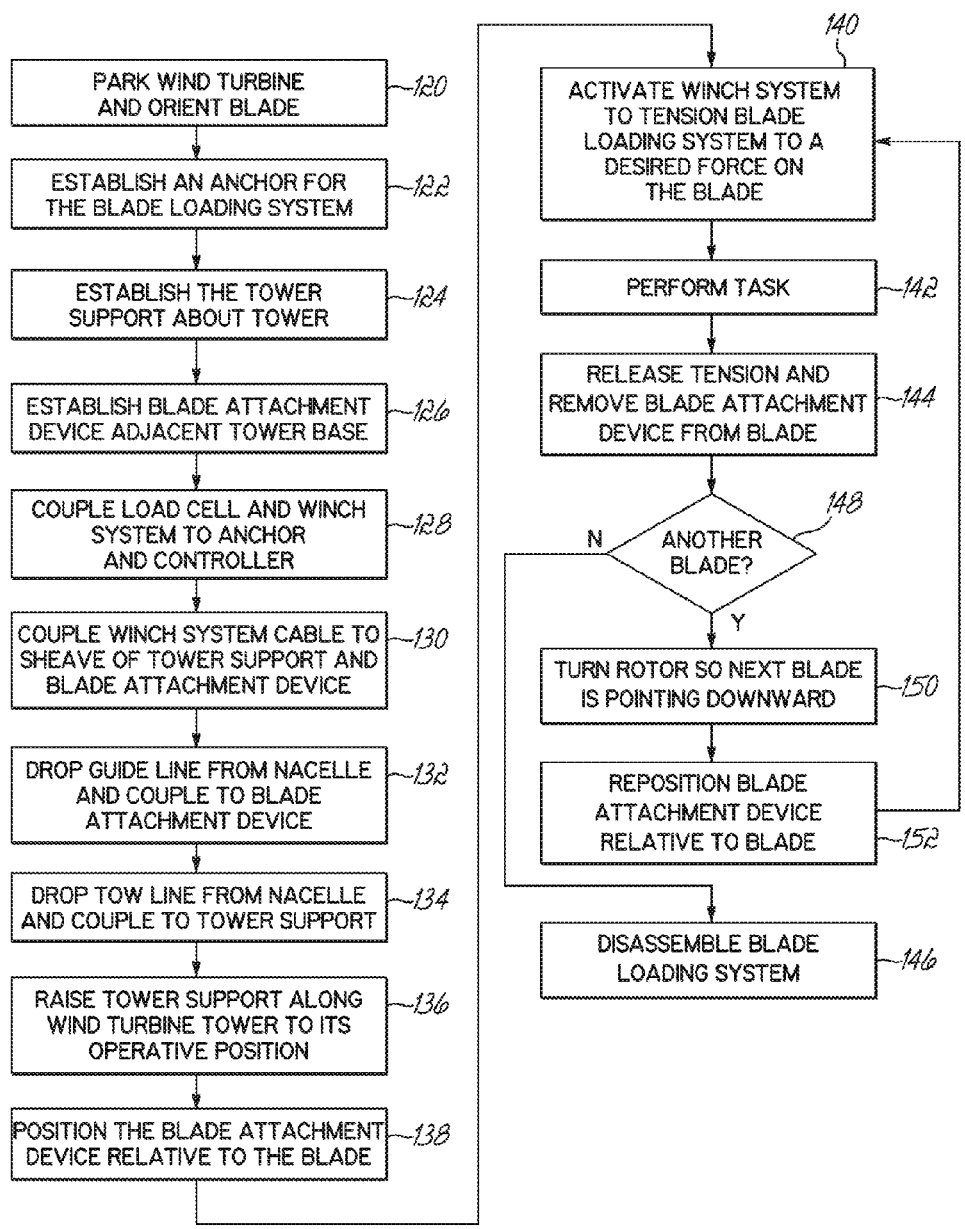
FIG. 4 is a flowchart illustrating various method steps in accordance with an embodiment of the invention.

With the various components of the blade loading system 26 described above, use of the blade loading system 26 will now be described, with reference being made to FIG. 4. Before using the blade loading system 26 to apply a force to the wind turbine blade 20, the wind turbine 10 must first be taken out of operation and placed in a parked condition with one of the blades 20 in the downward, six o'clock position adjacent to tower 12. Preferably, the rotor 16 of the wind turbine 10 is turned out of the wind such that the downwardly directed blade 20 is on the rear side of the tower 12 relative to the wind direction. These steps may be generally represented by step 120. The next steps will generally prepare the blade loading system 26 for coupling to the wind turbine 10, and more specifically to the downwardly directed blade 20. Notably, much of the preparation work for use of the blade loading system 26 may be done on the ground (or platform as the case may be), which is particularly convenient for maintenance personnel. In this regard, and as generally represented by step 122, a worker may establish the non-permanent, removable anchor 28. As discussed above, in one embodiment this may be achieved by securing one or more ratchet straps to the base 38 of the tower 12 and tightening the straps. Of course, if a permanent anchor is used, this step may be skipped.

Next, the tower support 34 may be established about the tower 12 adjacent the base 38. For example, the chain and hose assembly, as described above, may be placed about the tower 12 to define a closed-loop ring member 46 about the tower 12. If the sheave 58 is not already coupled to the tower support 34, the sheave 58 may be coupled to the tower support 34 just before or after the tower support 34 is disposed about the tower 12. As the tower support 34 is slightly oversized relative to the tower 12, the tower support 34 may loosely lie along the ground at the base 38 of the tower 12. These various aspects are represented in FIG. 4 as step 124.

Next, the blade attachment device 36 may be readied. In this regard, the strut 74 may be located on the ground in spaced relation from the tower 12 (e.g., vertically below the downward blade 20) with the sling 80 central portion pulled somewhat taut in the direction toward the tower 12 so as to define the generally triangular receiving space 90. The flap 94 may be pulled somewhat taut such that the apex 100 of the flap 94 is generally pointing away from the tower 12. The first, second and third guide lines 102, 104, 106 may be laid to the appropriate sides of the flap 94 so as not to cross each other or the sling 80. These aspects are generally represented in FIG. 4 as step 126.

Next, the load device 30 and load cell 32 may be readied. In this regard, the sling 60 may be coupled to the anchor 28 at one end thereof and coupled to the load cell 32 at another end thereof. The load cell 32 may then be coupled to the load device 30 (e.g., at least the motor block portion thereof, as the spool with cable may be separately fed to the motor block). This may be achieved by a direct coupling of the load cell 32 to the load device 30 or via a connector, such as another sling, rope or cable. This coupling should be such that the load device 30 remains fairly close to the ground during use of the blade loading system 26, such as against the outer surface 40 of the tower 12, as illustrated in FIG. 2. Additionally, the load device 30 and load cell 32 may be coupled to controller 68 by suitable electronic cables. These aspects are generally represented in FIG. 4 as step 128. Moreover, a length of cable 66 may be reeled out from the load device 30 with the end thereof being threaded through the sheave 58 on the tower support 34 and coupled to sling 80 of the blade attachment device 36. These aspects are generally represented in FIG. 4 as step 130.

Simultaneous with, or after completion of, the steps described above, one worker may position himself/herself in the nacelle 14 of the wind turbine 10. That worker may bring various items for carrying out aspects of the present invention. In this regard, that worker may bring a length of cable, rope, etc., which may operate as guide line 108, to the nacelle 14. Once there, the worker may open the hatch in the nacelle 14 and drop the guide line 108 to the ground, where a worker on the ground may couple the guide line 108 to the second and third guide lines 104, 106 of the blade attachment device 36. These aspects are generally represented by step 132. The worker in the nacelle 14 may also operate the on-board crane, or a separate drive device 52, so as to lower a tow line to the ground. The worker on the ground may then couple the tow line to the tower support 34 or to the tow cable 50, which is coupled to the tower support 34. As noted above, this coupling should be on the front side of the tower 12, opposite to the sheave 58. These aspects are generally represented by step 134.

The tower support 34 may be raised along the tower 12 to an operative position. In this regard, the worker in the nacelle 14 may activate the drive device 52 and raise the tower support 34 along the tower 12. As the tower support 34 is being raised by the drive device 52, it may angle slightly downwardly on the side of the sheave 58 (e.g., be higher on the side being lifted by the tow line 50). This may especially be the case for tower supports 34 that are generally flexible. The tower support 34 should be raised along the tower 12 such that the sheave 58 is generally horizontally aligned with the desired location for the force acting on the blade 20 from the blade loading system 26. This location may vary depending on the particular task being performed but in an exemplary embodiment may be within about the last 10 m of the blade 20. However, depending on the particular application, it may be important that the location of the force from the blade loading system 26 be generally accurate and repeatable. In this regard, a visual indicator may be used to locate the desired position of the force on the blade 20. In one embodiment, an existing feature of the blade 20 may provide a visual indicator for locating the force from the blade loading system 26. For example, wind turbine blades 20 often include lightning receptors along the length of the blade 20 for conducting a lightning strike to ground. These lightning receptors are generally visible on the surface of the blades 20 and can therefore serve as a visual indicator for accurately locating the force. In one embodiment, for example, it may be desirable to locate the force from the blade loading system 26 at one of the lightning receptors adjacent the tip of the blade 20. Of course, it should be recognized that other visual indicators may be used to locate the force from the blade loading system 26. These aspects are generally represented in FIG. 4 at step 136.

In one embodiment, a sufficient amount of cable 66 may be reeled out prior to or during the lifting of the tower support 34 such that the blade attachment device 36 is not raised off the ground during the lifting of the tower support 34 to its operative position. In this embodiment, after the tower support 34 is raised to its operative position on the tower 20, the blade attachment device 36 may be positioned relative to the blade 20. In this regard, the load device 30 may be used to raise the blade attachment device 36 at least part of the way to the blade 20. For example, the motor 64 may be activated, such as through controller 68 and remote control 70, to reel in the cable 66. Once the slack in the cable 66 is taken up, the blade attachment device 36 will start to be raised upwardly. As the blade attachment device 36 is moved upwardly, the first guide line 102 may be used to maintain the second cable portion 66b and blade attachment device 36 some distance from the first cable portion 66a to avoid tangling. The load device 30 may be turned off or deactivated prior to the blade attachment device 36 reaching the tower support 34. For example, the load device 30 may be deactivated when the blade attachment device 36 is several meters (e.g., about 10 m) from the sheave 58 and adjacent, but below, the tip of the blade 20.

With the blade attachment device 36 positioned proximate the tip of the blade 20, the blade attachment device 36 may be maneuvered so as to properly locate the blade attachment device 36 relative to the blade 20. In this regard, one worker on the ground may manually manipulate the first guide line 102 to horizontally position the blade attachment device 36 such that the tip of the blade 20 is generally aligned with the generally triangular receiving space 90 defined by the strut 74 and the sling 80. In coordination with that worker, another worker may be positioned through the hatch in the nacelle 14 for manually manipulating the guide line 108, which may be coupled to the second and third guide lines 104, 106. This worker manipulates the vertical positioning of the blade attachment device 36. For example, this worker may pull the guide line 108 upwardly when the tip of the blade 20 is aligned with the receiving space 90 such that the tip extends through the receiving space 90. These two workers may continue working in a coordinated manner until the blade attachment device 36 is positioned at the desired location on the blade 20. It is during this portion of the process that the colored flap 94 may be particularly beneficial. These aspects are generally represented by step 138 in FIG. 4.

When so positioned, the load device 30 may be activated to again start reeling in cable 66. As the cable 66 draws in, the blade loading system 26 becomes increasingly tensioned and the load cell 32 begins to register a force in the system 26. The load device 30 may continue to reel in the cable 66 until the load cell 32 indicates a desired force being imposed on the blade 20, at which point the load device 30 may be stopped. The blade loading system 26 essentially pulls the blade 20 toward the tower 12, creating a bending load in the blade 20. The amount of force imposed by blade loading system 26 may depend on the particular task being performed. By way of example and not limitation, for various blade structural integrity tests or inspections, the maximum imposed force on the blade 20 from the blade loading system 26 may be several hundred Newtons (e.g., about 200-300 N). In other applications where it is desirable to secure the blade 20 in a relatively fixed position, such as for a minor repair or the like, the maximum imposed force on the blade 20 from the blade loading system 26 may be less than about 100 N. It should be recognized that these values are exemplary and the amount of force may depend on the particular application and task being performed on the blade 20. These aspects are generally represented by step 140 in FIG. 4. In any event, as represented by step 142, when the desired force is imposed on the blade 20, the maintenance personnel may perform the particular task.

Once the particular task has been completed, the tension in the blade loading system 26 may be released by, for example, activating the load device 30 to reel out some amount of cable 66. With the tension released, the first guide line 102 and guide line 108 may be manipulated so as to remove the blade attachment device 36 from the blade 20. These aspects are generally represented by step 144 in FIG. 4. If the task to be performed was directed to only one blade 20 of the wind turbine 10 (e.g., such as a repair to only one blade), then the blade loading system 26 may be disassembled. In this regard, with the blade attachment device 36 clear of the blade 20, the load device 30 may be activated to reel out enough cable 66 so that the blade attachment device 36 may be positioned on the ground. At this point, the guide line 108 may be uncoupled from the blade attachment device 36 and the worker in the nacelle 14 may pull up the guide line 108 to the nacelle 14. Alternatively, the worker in the nacelle 14 may release the end of the guide line 108 and let it fall to the ground where it may be collected.

Next, the wind turbine's on-board crane 54 or other drive device 52 may be used to lower tower support 34 along the tower 12 back toward the base 38. Once the tower support 34 is on the ground, the load device cables 66 may be uncoupled from the blade attachment device 36 and from the sheave 58 and reeled in about its spool, for example. If the anchor 28 is of the temporary type, the anchor 28 may be disassembled. These aspects are generally represented by step 146 in FIG. 4. Once the blade loading system 26 has been disassembled and moved away from the wind turbine 10, the wind turbine 10 may be started back up and placed in its fully operational state.

Depending on the particular application, it may be necessary or desired to perform a task on another blade or on each of the blades 20 (e.g., test each of the blades 20 on the wind turbine 10). Once the blade loading system 26 has been set up for one of the blades 20, it is rather straight forward to use the blade loading system 26 on the other blades 20. This decision process is represented at step 148. In this regard, when the tension in the blade loading system 26 has been released and the blade attachment device 36 removed from the blade 20, the blade attachment device 36 may be moved so as to be out of the traveling path of the rotor 16 (e.g., below the blades 20 and/or toward the tower 12). With the blade attachment device 36 out of the way, the rotor 16 may be turned such that the next blade 20 is oriented in the generally downward position generally parallel to the tower 12, as represented by step 150.

At this point, the blade attachment device 36 may be moved back out so as to be proximate the tip of the blade 20 and the guide lines 102, 108 may again be manually manipulated so as to locate the blade attachment device 36 at the desired location along the blade 20. This is generally represented at 152. As described above, the load device 30 may reel in the cable 66 until the load cell 32 indicates a desired force being imposed on the blade 20, at which point the load device 30 may be stopped and the particular task performed. These steps may be repeated until the task has been performed on the desired number of blades (e.g., each of the blades 20). After this, the blade loading system 26 may be disassembled as described above.

The blade loading system 26 has a number of benefits over conventional systems. In this regard, the blade loading system 26 as described herein is capable of imposing a force on a blade without the need for an external crane or the like. Thus, one of the high cost items of various wind turbine maintenance procedures has been removed. Additionally, many of the components of the blade loading system 26 are easily transportable to a wind turbine site, for example, capable of fitting in a typical service vehicle (e.g., truck, van or the like) and capable of being lifted and positioned by a typical adult maintenance worker. In other words, the blade loading system is generally modular and light weight such that an adult maintenance worker can carry and set up the system.

Moreover, the blade loading system 26 is relatively easy to use and requires only two workers (at a minimum) to carry out the assembly, implementation, and disassembly of the system 26. In this regard, many of the assembly steps may be performed adjacent the base of the tower, such as on the ground (e.g., on-shore applications) or on a platform (e.g., off-shore applications) which is readily accessible by maintenance personnel. Additionally, other assembly steps may be performed with one worker on the ground or platform and another worker in the nacelle, which may be accessed through known and existing means (e.g., elevator or ladder inside the tower). Notably, the use of the blade loading assembly makes it such that no maintenance personnel have to be lifted up to the wind turbine blades, such as in a crane basket or the like, to attach equipment or devices on the blade for imposing a force on the blades. This may be particularly desirable from a safety concern standpoint. In short, the blade loading assembly 26 is effective for imposing a force on a wind turbine blade in a timely and highly cost-effective manner.

Moreover, the blade loading system 26 may be used in a wide variety of tasks performed on wind turbine blades, including various test, inspection, and repair procedures. By way of example and not limitation, the blade loading system 26 may be used as part of a laser shearography inspection of a wind turbine blade. In a laser shearography inspection, an inspection device is positioned in the interior of the blade and is configured to take an image of the blade under a no-load condition and one or more loaded conditions. Laser shearography is generally known in the art, and thus a further description of laser shearography is deemed unnecessary for a full understanding of the blade loading system 26. In any event, the blade loading system 26 as described herein may be used to generate the load on the blade for purposes of conducting the inspection. In accordance with the laser shearography method, the generated images may then be compared to glean certain information regarding the blade. For example, the comparison of the images may identify undesired irregularities in the material of the blade. The comparison may also reveal other defects in the blade. The use of the blade loading system 26 allows this type of inspection to be done in a cost effective manner.

By way of further example, the blade loading system 26 may also be used to secure or constrain a blade during a visual inspection or repair of the blade. For example, movement of the blade during a repair procedure may make the repair difficult to execute or may negatively impact the integrity of the repair. Thus, it is generally desirable to limit movement of the blade during a repair procedure. The blade loading system 26 may be used to reduce the movement of the blade during a repair, thereby allowing maintenance workers to more easily conduct the repair and increase the likelihood that the repair is successful.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. For example, while the blade loading system has been described with the cable extending from the load device to the guide member or sheave on the tower support, and then to the blade attachment device, in an alternative embodiment, the cable may extend from the load device to a guide member (e.g., sheave) on the blade loading device, and then to the tower support. Thus, the various features of the invention may be used alone or in any combination depending on the needs and preferences of the user.

What is claimed is:

1. A blade loading system for an assembled wind turbine having a tower, a nacelle, and a rotor having at least one wind turbine blade, the blade loading system configured to impose a force on the at least one wind turbine blade, the blade loading system comprising:
   a portable load device having a motor and a supply of cable, wherein the motor is configured to reel in or reel out the cable;
   a tower support configured to be movably coupled to the tower between a first position adjacent a base of the tower and an operative position adjacent the at least one blade, the tower support configured to be coupled to the cable from the load device; and
   a blade attachment device configured to be coupled to the at least one blade and further configured to be coupled to the cable of the load device, wherein when the blade attachment device is coupled to the at least one blade and the tower support is in the operative position, the load device is configured to be activated to induce tension in the cable so that a force is imposed on the at least one blade in a direction toward the tower.

2. The blade loading system according to claim 1, wherein the tower support includes a closed-loop ring member configured to be disposed about the tower.

3. The blade loading system according to claim 2, wherein the ring member includes an elongate flexible tensioning member disposed within an outer protective cover.

4. The blade loading system according to claim 3, wherein the elongate flexible tensioning member is selected from the group consisting of a rope, a chain, a cable, or combinations thereof.

5. The blade loading system according to claim 1, wherein the tower support further comprises a tow line configured to be coupled to a drive device in the nacelle for moving the tower support relative to the tower.

6. The blade loading system according to claim 5, wherein the tower support includes a guide member for redirecting the cable from the load device to the blade attachment device, and wherein the tow line and the guide member are on opposite sides of the tower support.

7. The blade loading system according to claim 1, wherein the tower support includes a guide member for redirecting the cable from the load device to the blade attachment device, the guide member including a sheave.

8. The blade loading system according to claim 1, wherein the blade attachment device is configured to couple to the at least one blade substantially through a friction coupling.

9. The blade loading system according to claim 1, wherein the blade attachment device comprises:
   an elongate main strut having a rigid inner member and an outer protective cover, the main strut configured to engage against a surface of the at least one blade; and
   a sling coupled to the main strut and configured to be coupled to the cable of the load device,
   wherein the main strut and sling defines a receiving space configured to receive a tip of the at least one blade therethrough.

10. The blade loading system according to claim 9, wherein the main strut is curved to generally correspond to the curvature of the at least one blade along the portion where the main strut is configured to engage the blade.

11. The blade loading system according to claim 9, further comprising a flap extending from the main strut opposite to the sling.

12. The blade loading system according to claim 11, wherein the flap has a color different than the at least one blade so as to operate as a visual indicator of the blade attachment device relative to the at least one blade.

13. The blade loading system according to claim 1, wherein the blade attachment device further comprising a first guide line configured to extend toward the tower base during use, and a second guide line configured to extend to the nacelle during use, wherein the first and second guide lines are configured to be manually manipulated to locate the blade attachment device relative to the blade.

14. The blade loading system according to claim 1, further comprising a load cell configured to provide an indication of the force imposed on the at least one blade from the blade loading system.

15. The blade loading system according to claim 14, further comprising a controller operatively coupled to the load device and operatively coupled to the load cell, wherein the controller is configured to control the operation of the load device based on indications from the load cell.

16. The blade loading system according to claim 1, further comprising an anchor configured to be coupled to the load device for supporting at least a portion of the load from the blade loading system during use.

17. The blade loading system of claim 16, wherein the anchor is configured to be removably coupled to the tower.

18. A method of applying a force to a wind turbine blade on an assembled wind turbine, the wind turbine having a tower, a nacelle, and a rotor having at least one blade, the method comprising:
   i) parking the wind turbine so that a wind turbine blade is pointed in a downward direction adjacent the tower;
   ii) coupling a tower support to the tower adjacent a base of the tower;
   iii) coupling a cable to a blade attachment device such that the cable engages a guide member of the tower support;
   iv) raising the tower support along the tower to an operative position adjacent the blade;
   v) coupling the blade attachment device to the blade; and
   vi) tensioning the cable to provide a force on the blade in a direction toward the tower.

19. The method according to claim 18, wherein coupling the tower support to the tower includes forming a closed-loop ring member about the outside of the tower adjacent the base of the tower.

20. The method according to claim 19, wherein forming the closed-loop ring member further comprises coupling portions of a flexible tensioning member to form the ring member.

21. The method according to claim 18, wherein raising the tower support along the tower comprises:
   extending a tow line from the nacelle;
   coupling the tow line to the tower support; and
   pulling the tow line upwardly to move the tower support along the tower to the operative position.

22. The method according to claim 21, wherein coupling the tow line to the tower support further comprises coupling the tow line to the tower support opposite to where the cable engages the guide member of the tower support.

23. The method according to claim 21, wherein the steps of extending the tow line and pulling the tow line upwardly include activating an on-board crane in the nacelle of the wind turbine.

24. The method according to claim 18, wherein raising the tower support along the tower to the operative position comprises:
   providing a visual indicator on the blade; and
   raising the tower support along the tower until the tower support is substantially horizontally aligned with the visual indicator.

25. The method according to claim 18, wherein coupling the blade attachment device to the at least one blade further comprises frictionally coupling the blade attachment device to the blade without a positive connection being formed between the blade attachment device and the blade.

26. The method according to claim 18, wherein coupling the blade attachment device to the blade further comprises positioning the blade attachment device such that the blade extends through a closed-loop receiving space of the blade attachment device.

27. The method according to claim 18, wherein coupling the blade attachment device to the blade further comprises:
   manually manipulating a first guide line extending from the blade attachment device toward the base of the tower; and
   manually manipulating a second guide line extending from the blade attachment device to the nacelle to position the blade attachment device relative to the blade.

28. The method according to claim 18, wherein coupling the blade attachment device to the blade further comprises:
   providing a visual indicator on the blade attachment device having a color that contrasts with the color of the blade; and
   positioning the blade attachment device relative to the blade using the visual indicator.

29. The method according to claim 18, wherein tensioning the cable to provide a force on the blade in a direction toward the tower further comprises activating a load device positioned adjacent the base of the tower and operatively coupled to the cable so as to induce tension in the cable.

30. The method according to claim 29, further comprising:
   providing an indication of the force acting on the blade from the blade loading system; and
   controlling the load device based on the indication of the force in order to reach or maintain a desired force acting on the blade.

31. The method according to claim 18, further comprising:
   releasing the tension in the cable;
   removing the blade attachment device from the blade;
   while maintaining the tower support in its operative position, rotating the rotor so that another blade is pointed in the downward direction adjacent the tower;
   coupling the blade attachment device to the another blade; and
   tensioning the cable to provide a force on the another blade in a direction toward the tower.

* * * * *